Nov. 6, 1934.  C. E. MORGENSTERN  1,979,839
SAFETY DEVICE
Filed Aug. 24, 1932   2 Sheets-Sheet 1
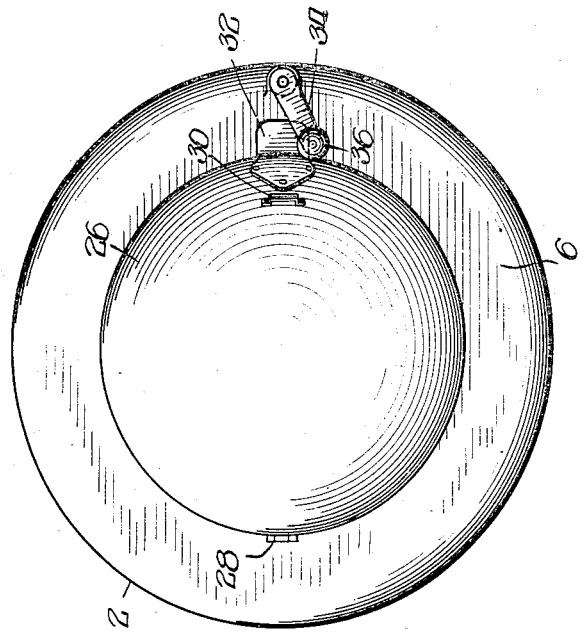
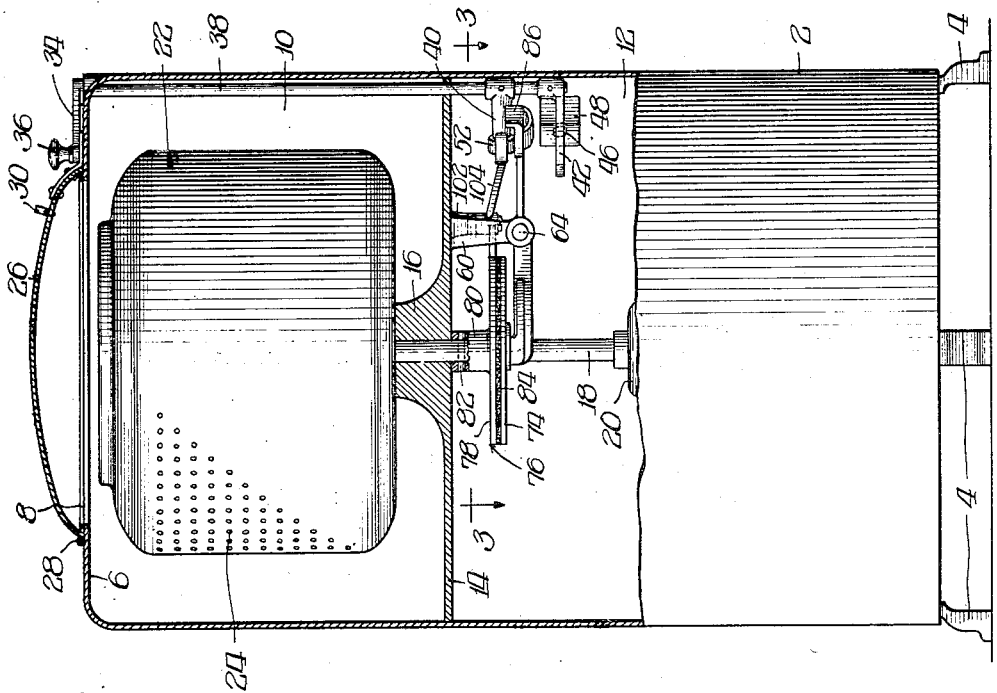
Inventor:
Charles E. Morgenstern,
By Wilkinson, Huxley, Byron & Knight
attys.

Nov. 6, 1934.　　　C. E. MORGENSTERN　　　1,979,839
SAFETY DEVICE
Filed Aug. 24, 1932　　2 Sheets-Sheet 2
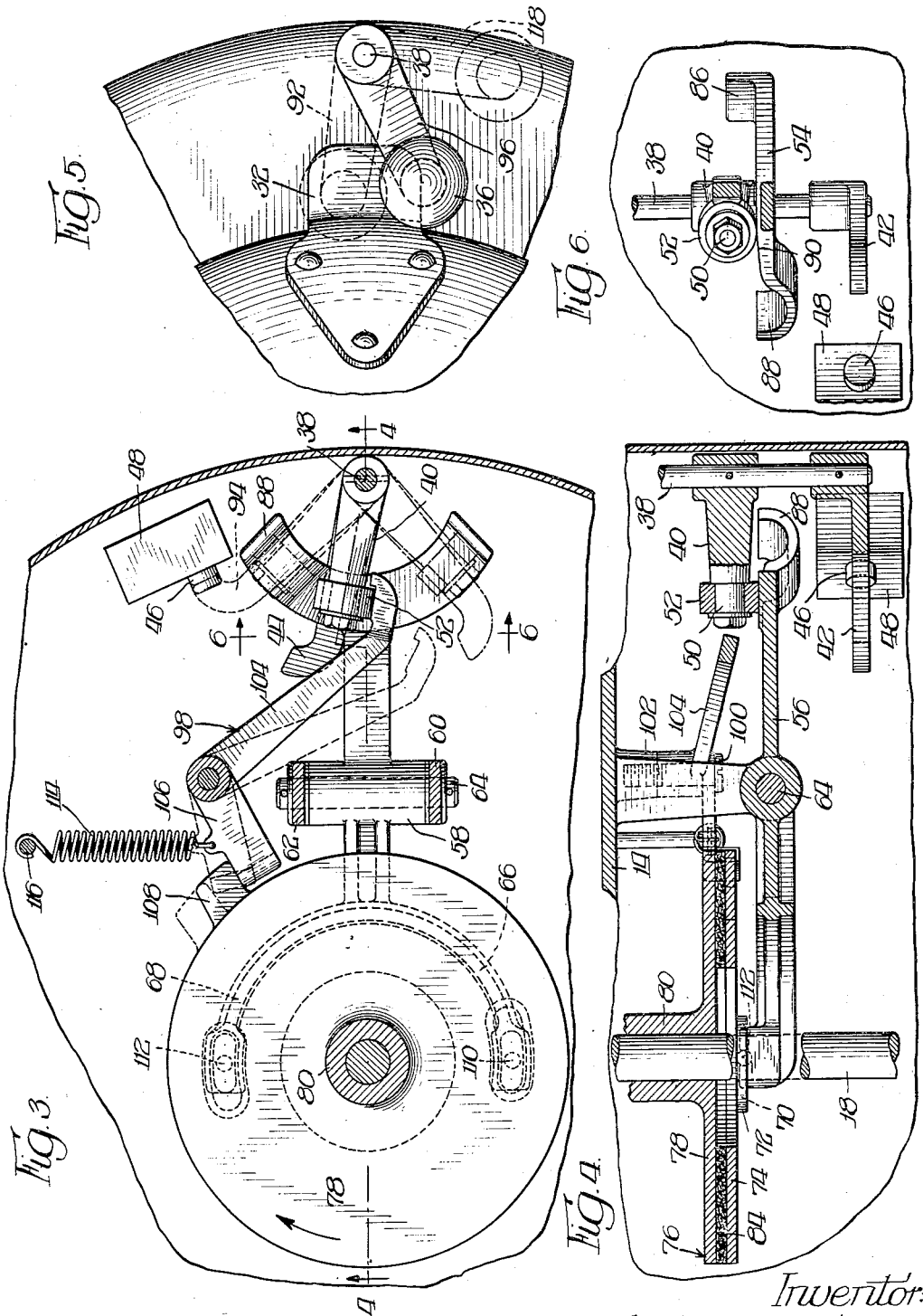
Inventor:
Charles E. Morgenstern,
By Wilkinson, Huxley, Byron & Knight
attys Patented Nov. 6, 1934

1,979,839

UNITED STATES PATENT OFFICE 1,979,839

SAFETY DEVICE

Charles E. Morgenstern, Springfield, Ohio, assignor to Robbins & Myers, Inc., Springfield, Ohio, a corporation of Ohio Application August 24, 1932, Serial No. 630,210

5 Claims. (Cl. 192—136)

The present invention relates to extractors, or the like, and more in particular to safety devices therefor.

Among the objects of the present invention is to provide a novel safety device for extractors and the like, whereby the closure means for the same is maintained in its locked position until the movable receptacle therefor comes to rest, thus preventing injury to the operator.

Still another object of the present invention is to provide a novel safety device for extractors and the like, in which the power means for operating the movable receptacle thereof is rendered inoperative, while the closure means for the extractor or the like is in its locked position.

The present invention comprehends the idea of providing a novel safety device for extractors or the like, suitably associated with brake means for the rotatable receptacle therefor, whereby the power means for this rotatable receptacle is rendered inoperative and the brake means applied for bringing the rotatable receptacle to rest, while the closure means for the extractor or the like is in its locked position.

A further object of the present invention is to provide a novel safety device for extractors and the like associated with the brake means for the receptacle suitably operated by power means, whereby the power means is rendered inoperative and the brake means applied for bringing the receptacle to rest only while the closure means for the extractor or the like is in its locked position, thereby preventing injury to the operator.

The present invention also includes the idea of providing novel safety means for an extractor or the like, in which the means for controlling the power means and brake means for the rotatable receptacle thereof is controlled by the locking means for the closure means, which is held to prevent operation thereof until the receptacle is brought to rest.

The present invention also contemplates the idea of providing novel safety means in an extractor or the like which is normally controlled by the brake means therefor, whereby the closure means for the extractor or the like is maintained in its locked position until the rotatable receptacle is brought to rest.

Other objects, features, capabilities and advantages are comprehended by the invention, as will later appear and as are inherently possessed thereby.

Referring to the drawings:

Figure 1 is a view in elevation of an extractor or the like incorporating an embodiment of the present invention, parts being broken away to disclose this embodiment more in detail;

Figure 2 is a top plan view of the embodiment shown in Figure 1 of the drawings;

Figure 3 is an enlarged fragmentary view in cross section taken in the plane represented by line 3—3 of Figure 1 of the drawings;

Figure 4 is a fragmentary view in cross section taken in a plane represented by line 4—4 of Figure 3 of the drawings;

Figure 5 is an enlarged fragmentary top plan view similar to Figure 2 of the drawings; and Figure 6 is a fragmentary view in cross section taken in a plane represented by line 6—6 of Figure 3 of the drawings.

Referring now more in detail to the drawings, an embodiment selected to illustrate the present invention is disclosed in a centrifugal extractor which comprises a casing 2 which is adapted to be supported upon a plurality of legs 4 or the like, this casing or housing 2 being formed with the upper inwardly disposed flange 6 defining an opening 8 leading into a drying chamber 10, which is separated from a lower chamber 12 as by means of the horizontal partition 14.

The partition 14 is formed with a central hub or bearing 16 adapted to receive a shaft 18 which may be suitably driven as by means of an electric motor 20 disposed within the chamber 12, and upon the upper end of which is an inner receptacle 22 adapted to be rotated or revolved thereby. This inner receptacle 22 is suitably apertured, as at 24, for passage of fluid therethrough and has an opening in its upper portion to receive clothes or other material to be dried, by means of centrifugal action upon rotation of this inner receptacle.

The upper chamber 10 is normally closed by a closure member 26 suitably hinged, as at 28, to the inwardly disposed flange 6, this closure member 26 being provided with a handle 30 whereby the same may be moved into and out of its closed position, a lug 32 being secured to the closure member 26 adjacent the handle 30, which is adapted to overlap the flange 6.

The closure member 26 is normally locked in its closed position by a lever 34 provided with the knob 36, which lever is secured to the vertical shaft 38, and the same is adapted to overlap the lug 32 of the cover or closure means 26. This shaft 38 is suitably mounted in the flange 6 and passes downwardly through the partition 14, spaced levers 40 and 42 being secured adjacent the lower end thereof. The lever 42 is provided with a curved end portion 44 adapted to engage a button 46 of a momentary contact switch 48 which may be secured to the housing or casing 2 in any desired manner, this switch being operated for effecting certain results as will be later more fully disclosed.

The lever 40 is provided with a shank 50 upon which is mounted a cam roller 52 which is adapted to operate in engaging relation with a cam portion 54 of a brake lever 56, this brake lever having a central hub portion 58 mounted upon a pin 64 extending between the spaced lugs 60 and 62 which depend downwardly from the partition 14. The brake lever 56 at its inner end is bifurcated to provide arms 66 and 68, each of which engages in a recess 70 formed by a flange 72 depending from the under surface of a brake plate 74 of a brake means 76. This brake means 76 includes an upper plate member 78 formed with a hub 80 secured to the power driven shaft 18 as by means of a lock pin 82, a friction disc 84 being interposed between the upper plate member 78 and the lower plate member 74 of this brake means.

The cam portion 54 of the brake lever 56 is substantially arcuate in shape, and is formed at one end with an upstanding stop flange 86, and at the other end with a groove 88 between which is provided a cam surface 90 for travel of the cam roller 52. It will be clearly apparent from the drawings that the levers 40 and 42 are connected to the shaft 38 so as to be movable upon movement of the locking lever 34, and when the locking lever 34 is in position, as shown in dotted lines in Figure 5 of the drawings and referred to as 92, the same overhangs the lug 32 to prevent an opening of the closure member 26. At this time the lever 42 is moved into the position as shown in Figure 3, and referred to as 94, thereby operating the switch 48 whereby the shaft 18 is driven to cause the inner receptacle 22 to revolve for drying the articles of clothing or the like disposed therein. When the levers 34 and 42 are in the position referred to as 92 and 94, respectively, the lever 40 is so disposed in relation to the cam portion 54 that the roller 52 thereof will be received within the groove 88, thereby allowing the brake lever 56 to rotate about the pin 64 in a counterclockwise direction, as shown in Figure 4, for releasing the brake means 76. The extractor is then operating under normal conditions for drying these articles retained within the inner receptacle.

When it is desired to bring the extractor to a stop and to remove these articles of clothing or the like, the lever 34 may be moved into the position as indicated at 96 in Figure 5 of the drawings, at which time the lever 42 releases the button 46 which breaks the circuit for the motor 20. The lever 40 is simultaneously rotated, and the roller 52 passes upwardly out of the groove 88 and over the cam surface 90 to effect a lowering of this end of the lever 56, thereby raising the arms 66 and 68 to move the lower plate 74 into braking engagement with the friction disc 84 and to effect a braking action on the shaft 18, thereby gradually bringing the inner receptacle 22 to a stop.

The present invention is concerned primarily with the idea of providing suitable means whereby the lever 34 cannot be operated to unlock the closure means 26 until the inner receptacle 22 has come to rest, thereby eliminating accidents which might otherwise occur should the cover be opened and the operator given a chance to insert his hands or clothing into the rotating inner receptacle 22, which is usually operated at high speeds. Such means includes a bell crank lever 98 rotatably supported upon a screw member 100 threaded in a boss 102 depending from the partition 14, this bell crank lever including an arm 104 adapted to engage with the roller 52, and another arm 106 substantially at right angles thereto which is in the path of movement of a lug 108 which may be formed integral with the lower plate 74 of the brake means 76.

When the extractor is operating at full speed and it is desired to stop the same, the lever 34 may be moved from the position as indicated at 92 to the position as indicated at 96, thereby rendering the switch 48 inoperative and at the same time depressing the cam portion 54 of the brake lever 56 to supply pressure to the plate 74. The plate 74 is normally mounted upon antifriction members 110 and 112 fitting within suitable recesses adjacent the end of the arms 66 and 68, and when the outer end of the lever 56 is depressed and this bifurcated end portion raised to effect a braking action, the lower plate 74 tends to rotate in the normal direction of rotation of the upper disc 78, which, as shown in Figure 3 of the drawings, is in a clockwise direction. This tendency to rotate is limited, however, by engagement of the arms 66 and 68 with the depending flange portions 72, but this limited movement of the plate 74 is sufficient for the lug 108 to move from its position as shown in dotted lines in Figure 3 into the position as shown in full lines, for engaging the arm 106 of the bell crank lever 98, and to cause the arm 104 to move into the path of movement of and engage with the roller 52, thereby preventing further movement of the lever 34 in a counterclockwise direction, as viewed in Figure 3, which would permit the lug 32 to clear this lever 34, whereby the closure member 26 could be opened.

The relative position of the various elements of the safety device described above is maintained as shown in Figure 3 of the drawings, until the inner receptacle 22 has come to rest. Just as soon as the inner receptacle has come to rest, the brake means 76, as well as the inner receptacle 22, is moved in a counterclockwise direction under the impulse of a coil spring 114 having one end thereof connected to the arm 106 of the bell crank lever 98, and the other end thereof connected to a pin or lug 116, which may be secured to the partition 14. This counterclockwise movement of the brake means 76, as well as the inner receptacle 22, is limited to the clearance between the arms 66 and 68 and the downwardly depending flanges 72, and is sufficient to permit the bell crank lever 98 to assume the position as shown in dotted lines in Figure 3 of the drawings, whereby the arm 104 is moved out of the path of movement of the roller 52. The lever 40 is therefore free to move outwardly along the surface of the cam portion 54 and the locking lever 34 may be moved into the position, as designated by reference numeral 118 in Figure 5 of the drawings, whereby the closure member 26 may be opened, the outward movement of the locking lever 34 being limited by engagement of the roller 52 with the stop flange 86.

After the receptacle 22 has been emptied, other clothing or the like to be dried may be introduced therein, the cover 26 closed, and the locking lever 34 moved into the position as indicated at 92 in Figure 5 of the drawings. Movement of this locking lever 34 rotates the shaft 38 and effects an engagement of the lever 42 with the button 46, thereby effecting an operation of the power means for driving the shaft 18. At this time the roller 52 has passed over the cam surface 90 and into the groove 88, thereby releasing the lever 56, whereby the plate 74 is disengaged from its braking contact with the friction disc 84, thereby permitting the shaft 18 and inner receptacle 22 to attain normal operating speed. The closure member 26 is locked during the operation of the device, and in order to again gain access to the inner receptacle 22, it is necessary to bring the locking lever 34 into the position as designated at 96 in Figure 5 of the drawings, allowing the inner receptacle 22 to come to rest, after which of course this lever may be moved into the position indicated as 118 in Figure 5.

It will be quite apparent from the above disclosure that novel safety means has been provided for effectively preventing accidents to the operator of a machine of the kind described, and that the same is automatic in operation and easily and readily controlled as by means of the locking means for the cover or closure means therefor.

While I have herein described and upon the drawings shown an illustrated embodiment of the invention, it is to be understood that the invention is not limited thereto but may comprehend other constructions, arrangements of parts, details and features without departing from the spirit of the invention.

I claim:

1. In an extractor or the like, the combination of a receptacle, power means for moving said receptacle, said means including a switch, brake means for said receptacle, and means for controlling said brake means and switch, said means including a movable lever having a cam surface, means movable over said cam surface operable in one position to operate said switch and permit movement of said lever to release said brake means and in another position to disengage said switch and move said lever to apply said brake.

2. In an extractor or the like, the combination of a receptacle, power means for moving said receptacle, said means including a switch, and means for controlling said brake means and switch, said means including a movable lever having a recess and a cam surface adjacent thereto, a movable member provided with a cam roller adapted to operate said switch and to release said brake means when said roller is disposed in said groove and to disconnect said switch and apply said brake upon movement of said roller over said cam surface.

3. In an extractor or the like, the combination of an outer receptacle, an inner receptacle mounted for rotation therein, closure means for said outer receptacle, power means for driving said inner receptacle, means for locking said closure means, brake means for said inner receptacle, means operated by said locking means for operating said power and brake means, said brake means including a brake plate provided with a lug, a movable lever engaging therewith, and safety means for holding said operating means in a position for applying said brake means and for holding said locking means in a locking position until said inner receptacle comes to rest, said means including a member actuated by said lug and engaging with said operating means, and means for releasing said member.

4. In an extractor or the like, the combination of an outer receptacle, an inner receptacle mounted for rotation therein, closure means for said outer receptacle, power means for driving said inner receptacle, means for locking said closure means, brake means for said inner receptacle, means operated by said locking means for operating said power and brake means, said brake means including a brake plate provided with a lug, a movable lever engaging therewith, safety means for holding said operating means in a position for applying said brake means and for holding said locking means in a locking position until said inner receptacle comes to rest, said means including a member actuated by said lug and engaging with said operating means, and means for reversing the normal direction of movement of said plate when said inner receptacle comes to rest to release said member from its engaging relation with said operating means.

5. In an extractor or the like, the combination of an outer receptacle, an inner receptacle mounted for rotation therein, closure means for said outer receptacle, power means for driving said inner receptacle, means for locking said closure means, brake means for said inner receptacle, means operated by said locking means for operating said power and brake means, said brake means including a brake member provided with a lug, a movable lever engaging therewith, means for limiting movement of said member relative to said lever, and safety means for holding said operating means in a position for applying said brake means and for holding said locking means in a locking position until said inner receptacle comes to rest, said means including a member actuated by said lug and engaging with said operating means, and means operable when said inner receptacle comes to rest for reversing the normal direction of movement of said brake member within the limits of said limiting means to release said member from its engaging relation with said operating means whereby said locking means can be operated to unlock said closure means only after said receptacle has come to rest.

CHARLES E. MORGENSTERN.